United States Patent
Liu et al.

(10) Patent No.: US 12,146,567 B2
(45) Date of Patent: Nov. 19, 2024

(54) CONTINUOUSLY VARIABLE TRANSMISSION, METHOD FOR CONTROLLING CONTINUOUSLY VARIABLE TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Peng Liu, Sagamihara (JP); Seiichirou Takahashi, Isehara (JP); Daigo Kishi, Kanagawa (JP); Tetsuya Shimada, Kanagawa (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/261,884

(22) PCT Filed: Jan. 18, 2022

(86) PCT No.: PCT/JP2022/001601
§ 371 (c)(1),
(2) Date: Jul. 18, 2023

(87) PCT Pub. No.: WO2022/158448
PCT Pub. Date: Jul. 28, 2022

(65) Prior Publication Data
US 2024/0301950 A1    Sep. 12, 2024

(30) Foreign Application Priority Data
Jan. 19, 2021 (JP) ................................. 2021-006419

(51) Int. Cl.
*F16H 59/18* (2006.01)
*F16H 61/662* (2006.01)

(52) U.S. Cl.
CPC ....... *F16H 61/66259* (2013.01); *F16H 59/18* (2013.01)

(58) Field of Classification Search
CPC ............... F16H 61/66259; F16H 59/18; F16H 2059/183; F16H 59/20; F16H 61/6648;
(Continued)

(56) References Cited

U.S. PATENT DOCUMENTS

| 5,474,505 A * | 12/1995 | Seidel ............... F16H 61/66259 477/49 |
| 7,578,767 B2 * | 8/2009 | Matsudaira ......... F16H 61/0213 477/120 |
| 2009/0192020 A1 * | 7/2009 | Futamura ............ F16H 61/0213 477/199 |

FOREIGN PATENT DOCUMENTS

JP    2012-225417 A    11/2012

* cited by examiner

*Primary Examiner* — Roger L Pang
(74) *Attorney, Agent, or Firm* — Foley & Lardner LLP (57) ABSTRACT

A transmission used for executing, a process of performing, when a speed at which an accelerator opening is decreased is higher than a predetermined speed, an upshift until a predetermined opening is reached, and fixing a speed ratio, a process of performing, when the speed is equal to or lower than the predetermined speed and a turbine rotation speed is higher than a predetermined rotation speed, the upshift until the predetermined opening is reached, and performing, when the accelerator opening is smaller than the predetermined opening, the upshift so as to fix the speed ratio, and a process of performing, when the speed is equal to or lower than the predetermined speed and the turbine rotation speed is equal to or lower than the predetermined rotation speed, the upshift until the predetermined opening is reached, and performing, when the accelerator opening is smaller than the predetermined opening, the upshift.

5 Claims, 8 Drawing Sheets

(58) Field of Classification Search
CPC ............ B60W 10/101; B60W 10/107; B60W 10/108; B60W 2540/10; B60W 2540/103; B60W 2710/1005; B60W 30/18072
USPC ................ 701/51, 57; 477/44, 120, 121
See application file for complete search history.

CONTINUOUSLY VARIABLE TRANSMISSION, METHOD FOR CONTROLLING CONTINUOUSLY VARIABLE TRANSMISSION, AND NON-TRANSITORY COMPUTER-READABLE MEDIUM

TECHNICAL FIELD

The present invention relates to a continuously variable transmission, a method for controlling a continuously variable transmission, and a program.

BACKGROUND ART

Patent Literature 1 discloses a shift control in which, in a case where an accelerator release operation is performed, when a steady traveling intention is determined, a speed ratio of a belt continuously variable transmission is upshifted such that an input rotation speed is gradually decreased to a target rotation speed obtained according to an accelerator operation amount after the accelerator release operation and a vehicle speed, and when a deceleration intention is determined, the speed ratio of the belt continuously variable transmission is upshifted to a fixed speed ratio smaller than an immediately preceding speed ratio, and then the speed ratio is fixed to the fixed speed ratio.

Accordingly, when the deceleration intention is determined, an engine rotation speed is decreased by an upshift amount, and occurrence of a deceleration G equal to or more than an intention of a driver due to a reduction of an engine brake is prevented, as compared with a case where the speed ratio immediately preceding the accelerator release operation is maintained as it is. In addition, inertia in a driving direction is generated due to the decrease in the engine rotation speed caused by the upshift, and the engine brake is reduced (offset) to prevent a shock.

PRIOR ART DOCUMENT

Patent Literature

Patent Literature 1: JP 2012-225417 A

SUMMARY OF INVENTION

However, in the shift control described above, when the accelerator release operation is performed (when an accelerator opening is decreased), there are only two shift patterns corresponding to the steady traveling intention and the deceleration intention, and a shift control against an intention of the driver may be executed. That is, for the driver, it is conceivable that the engine rotation speed is excessively decreased when an accelerator is released with the deceleration intention, or the engine rotation speed is not decreased when the accelerator is released with the steady traveling intention. In such a case, there is a possibility that a power performance of a vehicle is not exhibited as intended for subsequent steering by the driver.

The present invention has been made in view of such a technical problem, and an object thereof is to prevent execution of a shift control against an intention of a driver when an accelerator opening is decreased.

According to one aspect of the present invention, a continuously variable transmission to be mounted on a vehicle is provided. The continuously variable transmission is used for executing when an accelerator opening is decreased while the vehicle is traveling, a first process of performing, when a speed at which the accelerator opening is decreased is higher than a predetermined speed, an upshift according to the accelerator opening until a predetermined opening is reached, and fixing a speed ratio at the speed ratio when the accelerator opening is the predetermined opening, a second process of performing, when the speed at which the accelerator opening is decreased is equal to or lower than the predetermined speed and a turbine rotation speed is higher than a predetermined rotation speed, the upshift according to the accelerator opening until the predetermined opening is reached, and further performing, when the accelerator opening is smaller than the predetermined opening, the upshift from the speed ratio when the accelerator opening is the predetermined opening so as to fix the speed ratio to be higher than the speed ratio when the accelerator opening is the predetermined opening, and a third process of performing, when the speed at which the accelerator opening is decreased is equal to or lower than the predetermined speed and the turbine rotation speed is equal to or lower than the predetermined rotation speed, the upshift according to the accelerator opening until the predetermined opening is reached, and further performing, when the accelerator opening is smaller than the predetermined opening, the upshift according to the accelerator opening.

In the above aspect, when the accelerator opening is decreased, the second process of performing the upshift according to the accelerator opening until the predetermined opening is reached, and further performing, when the accelerator opening is smaller than the predetermined opening, the upshift from the speed ratio when the accelerator opening is the predetermined opening so as to fix the speed ratio to be higher than the speed ratio when the accelerator opening is the predetermined opening is added to the first process of performing the upshift according to the accelerator opening until the predetermined opening is reached and fixing the speed ratio at the speed ratio when the accelerator opening is the predetermined opening to maintain an engine rotation speed in a high state, and the third process of performing the upshift according to the accelerator opening until the predetermined opening is reached, and further performing, when the accelerator opening is smaller than the predetermined opening, the upshift according to the accelerator opening to decrease the engine rotation speed, and thus it is possible to prevent the engine rotation speed from becoming too high or too low for an intention of a driver. That is, it is possible to prevent execution of a shift control against the intention of the driver when the accelerator opening is decreased.

DESCRIPTION OF EMBODIMENTS

Hereinafter, an embodiment of the present invention will be described with reference to the accompanying drawings.

Hereinafter, a case where a speed ratio is large is referred to as Low, and a case where a speed ratio is small is referred to as High. Shifting the speed ratio to be lower is referred to as a downshift, and shifting the speed ratio to be higher is referred to as an upshift.

Figure 1:
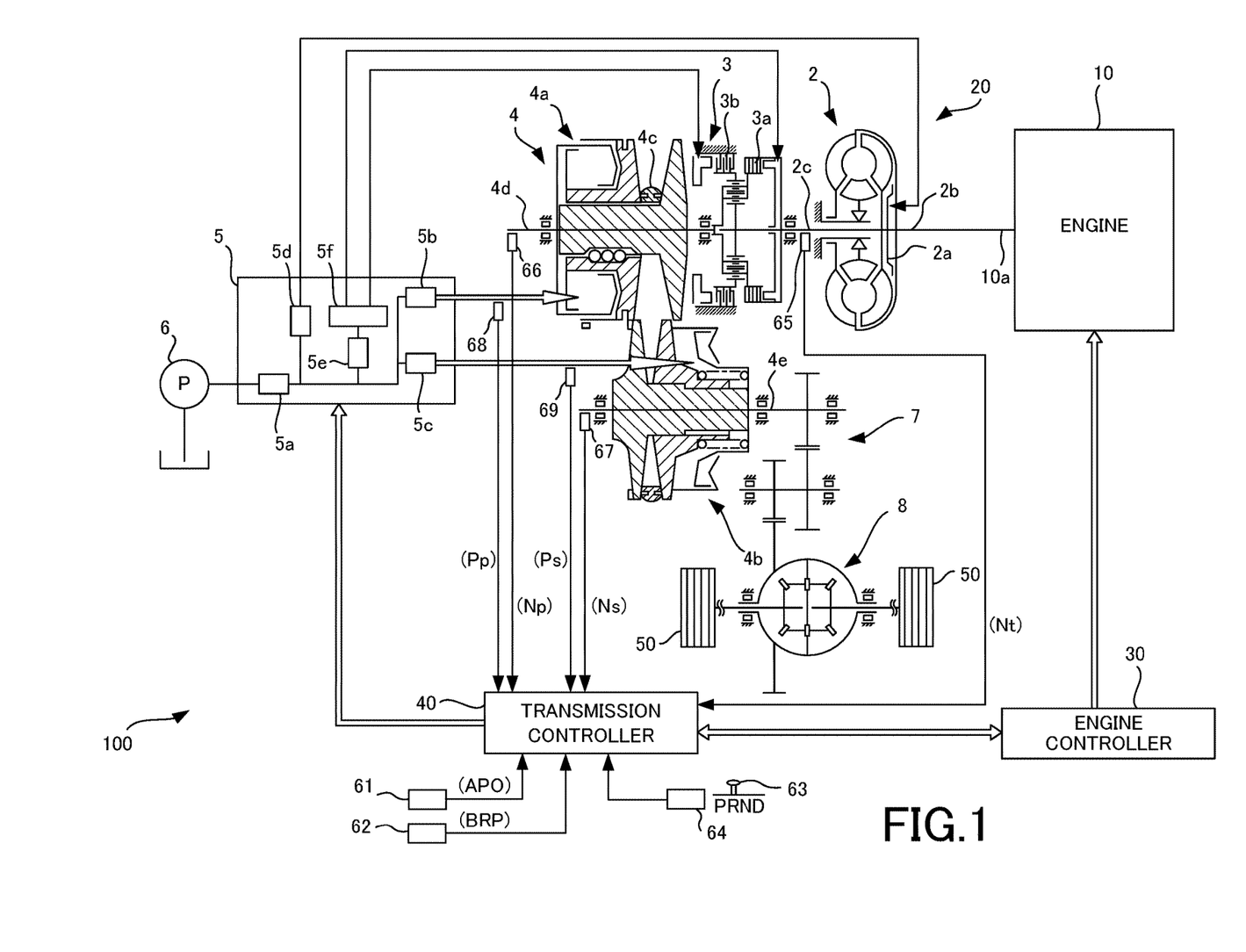
FIG. 1 is a schematic configuration diagram of a vehicle including an automatic transmission according to an embodiment of the present invention.

FIG. 1 is a schematic configuration diagram of a vehicle 100 including an automatic transmission 20 as a continuously variable transmission according to an embodiment of the present invention. As shown in FIG. 1, the vehicle 100 includes an engine 10 as a drive source, the automatic transmission 20, an engine controller 30, and a transmission controller 40.

The automatic transmission 20 includes a torque converter 2, a forward/reverse switching mechanism 3, a variator 4, a hydraulic control circuit 5, and an oil pump 6.

In the vehicle 100, rotation generated in the engine 10 is transmitted to driving wheels 50 via the torque converter 2, the forward/reverse switching mechanism 3, the variator 4, a gear set 7, and a differential gear device 8.

The torque converter 2 is provided with a lock-up clutch 2a. When the lock-up clutch 2a is engaged, an input shaft 2b as an input element and an output shaft 2c as an output element of the torque converter 2 are directly connected to each other, and the input shaft 2b and the output shaft 2c rotate at the same speed. Therefore, in a state where the lock-up clutch 2a is engaged, rotation of an output shaft 10a of the engine 10 is directly transmitted via the output shaft 2c of the torque converter 2 to the forward/reverse switching mechanism 3.

The forward/reverse switching mechanism 3 includes a double pinion planetary gear set as a main component, a sun gear of the double pinion planetary gear set is coupled to the engine 10 via the torque converter 2, and a carrier of the double pinion planetary gear set is coupled to an input shaft 4d (primary pulley 4a) of the variator 4. The forward/reverse switching mechanism 3 further includes a forward clutch 3a that directly connects the sun gear and the carrier of the double pinion planetary gear set, and a reverse brake 3b that fixes a ring gear. When the forward clutch 3a is engaged, input rotation from the engine 10 via the torque converter 2 is directly transmitted to the primary pulley 4a, and when the reverse brake 3b is engaged, the input rotation from the engine 10 via the torque converter 2 is reversely decelerated and transmitted to the primary pulley 4a.

The variator 4 is a continuously variable transmission mechanism that shifts the rotation of the engine 10 transmitted to the input shaft 4d and transmits the shifted rotation from an output shaft 4e to the driving wheels 50. The variator 4 includes the primary pulley 4a provided on an engine 10 side in a power transmission path, a secondary pulley 4b provided on a driving wheel 50 side in the power transmission path, and a belt 4c as an endless member that is wound around the primary pulley 4a and the secondary pulley 4b.

In the variator 4, a hydraulic pressure supplied to the primary pulley 4a and a hydraulic pressure supplied to the secondary pulley 4b are controlled, so that a contact radius between each of the pulleys 4a and 4b and the belt 4c is changed, and a speed ratio is changed.

The oil pump 6 is a mechanical oil pump that receives the rotation of the engine 10 and is driven using a part of power of the engine 10. Oil discharged from the oil pump 6 is supplied to the hydraulic control circuit 5.

The hydraulic control circuit 5 includes: a regulator valve 5a that adjusts a pressure of hydraulic oil supplied from the oil pump 6 to generate a required hydraulic pressure; a primary solenoid valve 5b that adjusts a hydraulic pressure supplied to the primary pulley 4a; a secondary solenoid valve 5c that adjusts a hydraulic pressure supplied to the secondary pulley 4b; a lock-up solenoid valve 5d that adjusts a hydraulic pressure supplied to the lock-up clutch 2a; a select solenoid valve 5e that adjusts a hydraulic pressure supplied to the forward clutch 3a and a hydraulic pressure supplied to the reverse brake 3b; a manual valve 5f that switches supply paths of the hydraulic pressures to the forward clutch 3a and the reverse brake 3b; and the like.

The hydraulic control circuit 5 supplies the adjusted hydraulic pressure to each of the torque converter 2, the forward/reverse switching mechanism 3, and the variator 4 based on a control signal from the transmission controller 40.

The engine controller 30 is implemented by a microcomputer including a CPU, a RAM, a ROM, an input and output interface, and the like. The engine controller 30 executes various processes by reading and executing, by the CPU, programs stored in the ROM. The engine controller 30 may also be implemented by a plurality of microcomputers.

The engine controller 30 controls a rotation speed, a torque, and the like of the engine 10 based on signals from various sensors each detecting a state of each part of the vehicle 100.

The transmission controller 40 is implemented by a microcomputer including a CPU, a RAM, a ROM, an input and output interface, and the like, and is communicably connected to the engine controller 30. The transmission controller 40 executes various processes by reading and executing, by the CPU, programs stored in the ROM. The transmission controller 40 may also be implemented by a plurality of microcomputers. The transmission controller 40 and the engine controller 30 may be integrated into one controller.

The transmission controller 40 controls an engaged state of the lock-up clutch 2a, the speed ratio of the variator 4, engaged states of the forward clutch 3a and the reverse brake 3b, and the like based on signals from various sensors each detecting a state of each part of the vehicle 100.

The transmission controller 40 receives a signal from an accelerator opening sensor 61 that detects an accelerator opening APO, a signal from a brake hydraulic pressure sensor 62 that detects a brake hydraulic pressure BRP corresponding to an operation amount of a brake pedal, a signal from an inhibitor switch 64 that detects a position of a shifter 63, a signal from a turbine rotation speed sensor 65 that detects a rotation speed Nt of the output shaft 2c of the torque converter 2 (hereinafter referred to as a turbine rotation speed Nt), a signal from a primary rotation speed sensor 66 that detects a rotation speed Np of the input shaft 4d (primary pulley 4a) of the variator 4 (hereinafter referred to as a primary rotation speed Np), a signal from a secondary rotation speed sensor 67 that detects a rotation speed Ns of the output shaft 4e (secondary pulley 4b) of the variator 4, a signal from a primary hydraulic pressure sensor 68 that detects a primary hydraulic pressure Pp supplied to the primary pulley 4a, a signal from a secondary hydraulic pressure sensor 69 that detects a secondary hydraulic pressure Ps supplied to the secondary pulley 4b, and the like.

Next, a shift control executed by the transmission controller 40 will be described.

As described above, the transmission controller 40 controls the speed ratio of the variator 4. There are various types of shift control executed by the transmission controller 40, and one is selected according to a situation of the vehicle 100.

Examples of the shift control include a normal shift control that is executed in a situation in which the vehicle 100 is considered to be traveling normally, and a linear shift control that is executed in a situation in which a driver is considered to desire to perform sporty traveling. Each shift control is executed using a shift map or the like set in advance based on various factors of the vehicle 100, experiments, and the like.

In the linear shift control, a change in a speed ratio is prevented and the vehicle 100 is accelerated, so that the driver can obtain a sporty traveling feeling.

Here, considering a case where an accelerator release operation is performed during execution of the linear shift control, for example, the accelerator release operation may be performed with an intention of decelerating the vehicle 100 before entering a curve, or the accelerator release operation may be performed with an intention of the driver of ending the sporty traveling.

In a case of the temporary accelerator release operation due to entering the curve, it can be said that maintaining a speed ratio at or near a speed ratio immediately preceding the accelerator release operation in preparation for the subsequent re-acceleration meets the intention of the driver. On the other hand, in a case of the accelerator release operation with the intention of ending the sporty traveling, maintaining the speed ratio at or near the speed ratio immediately preceding the accelerator release operation may not meet the intention of the driver.

In the case where the accelerator release operation is performed during the execution of the linear shift control, when a shift control against the intention of the driver is executed, the driver may feel uncomfortable. Therefore, in the case where the accelerator release operation is performed during the execution of the linear shift control, the transmission controller 40 of the present embodiment executes processes (first process, second process, and third process) determined by a determination process shown in FIG. 2, thereby preventing the execution of the shift control against the intention of the driver.

Figure 2:
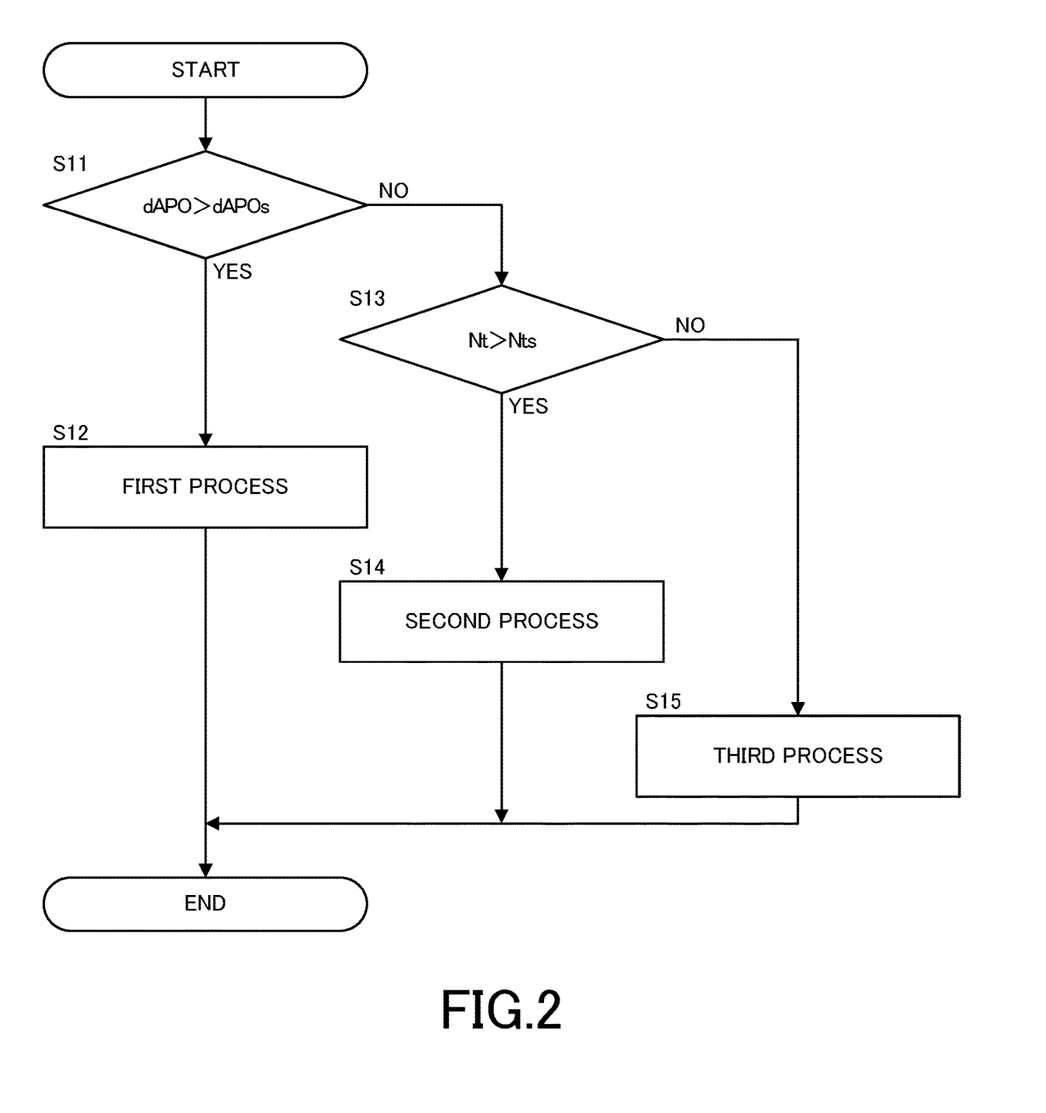
FIG. 2 is a flowchart of a determination process.

Hereinafter, the determination process will be described with reference to FIG. 2. FIG. 2 is a flowchart of the determination process.

The determination process is executed when the accelerator release operation is performed while the vehicle 100 is traveling and the linear shift control is being executed, that is, when the accelerator opening APO is decreased.

In step S11, the transmission controller 40 determines whether a speed dAPO [deg/sec] at which the accelerator opening APO is decreased is higher than a predetermined speed dAPOs.

The higher the speed dAPO is, the faster the steering of the driver is, and it is considered that the driver desires to continue the sporty traveling. The predetermined speed dAPOs is a threshold value at which it is considered that the driver desires to continue the sporty traveling when the speed dAPO is higher than the predetermined speed dAPOs. The predetermined speed dAPOs is set in advance based on various factors of the vehicle 100, experiments, and the like.

When the transmission controller 40 determines that the speed dAPO is higher than the predetermined speed dAPOs, the process proceeds to step S12. When the transmission controller 40 determines that the speed dAPO is not higher than the predetermined speed dAPOs, the process proceeds to step S13.

In step S12, the transmission controller 40 determines to execute the first process. The first process will be described in detail later with reference to FIG. 3.

In step S13, the transmission controller 40 determines whether the turbine rotation speed Nt is higher than a predetermined rotation speed Nts. While the vehicle 100 is traveling forward, the lock-up clutch 2a and the forward clutch 3a are in an engaged state, so that the turbine rotation speed Nt, the primary rotation speed Np, and an engine rotation speed are equal.

It is considered that the higher the turbine rotation speed Nt (=engine rotation speed) is, the more the driver desires to perform the sporty traveling. The predetermined rotation speed Nts is a threshold value at which it is considered that the driver may desire to continue the sporty traveling even if the speed dAPO is not higher than the predetermined speed dAPOs. The predetermined rotation speed Nts is set in advance based on various factors of the vehicle 100, experiments, and the like.

When the transmission controller 40 determines that the turbine rotation speed Nt is higher than the predetermined rotation speed Nts, the process proceeds to step S14. When the transmission controller 40 determines that the turbine rotation speed Nt is not higher than the predetermined rotation speed Nts, the process proceeds to step S15.

In step S14, the transmission controller 40 determines to execute the second process. The second process will be described in detail later with reference to FIG. 4.

In step S15, the transmission controller 40 determines to execute the third process. The third process will be described in detail later with reference to FIG. 5.

Figure 3:
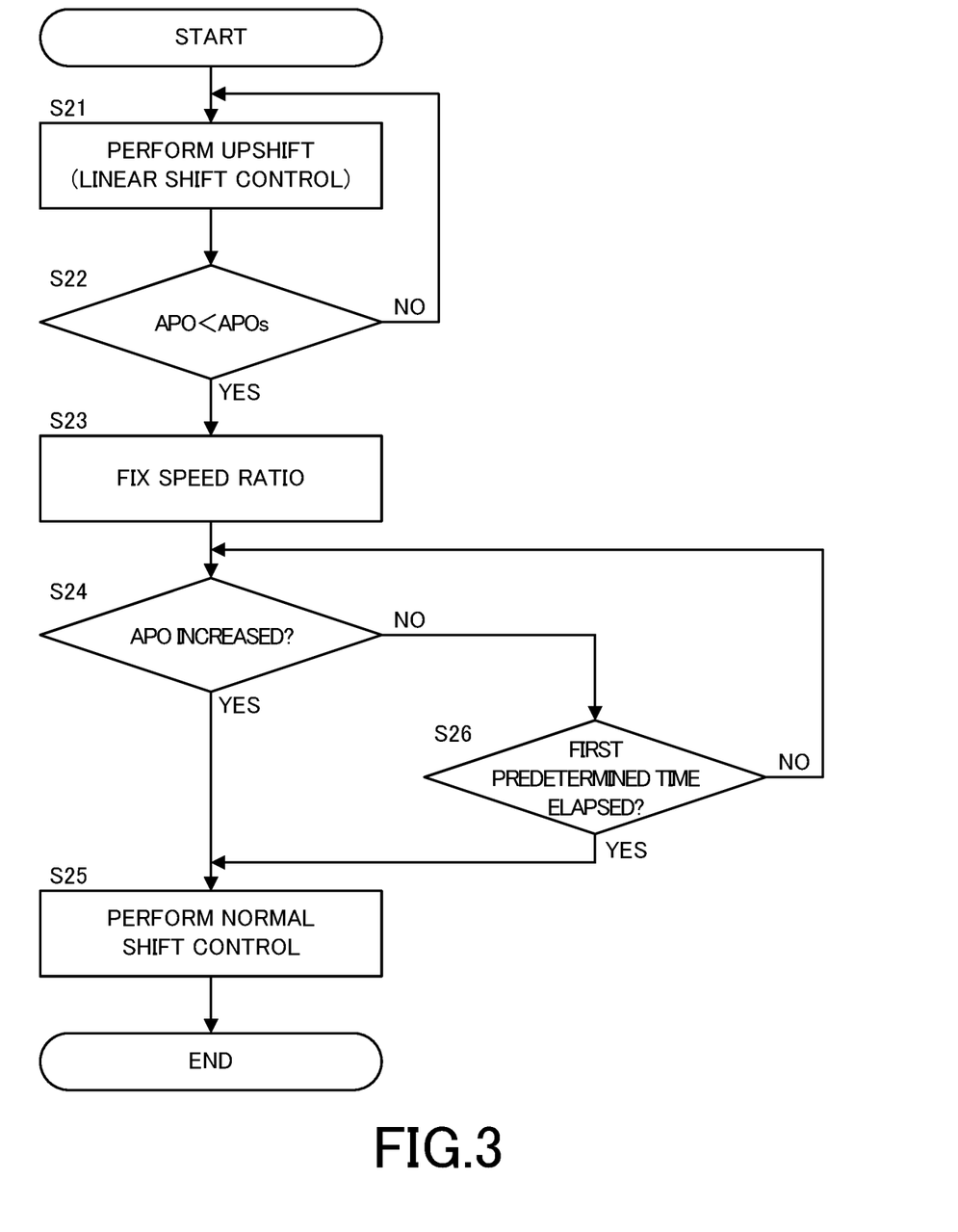
FIG. 3 is a flowchart of a first process.

Next, the first process will be described with reference to FIG. 3. FIG. 3 is a flowchart of the first process. The first process is executed when it is determined in the determination process that the first process is to be executed.

In step S21, the transmission controller 40 performs an upshift based on the linear shift control. Specifically, the upshift is performed according to the accelerator opening APO using a shift map or the like for the linear shift control.

In step S22, the transmission controller 40 determines whether the accelerator opening APO is smaller than a predetermined opening APOs.

When the transmission controller 40 determines that the accelerator opening APO is smaller than the predetermined opening APOs, the process proceeds to step S23. When the transmission controller 40 determines that the accelerator opening APO is not smaller than the predetermined opening APOs, the process returns to step S21 to continuously perform the upshift based on the linear shift control.

When an accelerator release operation amount is small, the driver may finely adjust the accelerator opening APO. That is, an accelerator may be immediately depressed. The predetermined opening APOs is a threshold value at which it is considered that the continuation of the linear shift control in preparation for a case where the driver immediately depresses the accelerator meets the intention of the driver. The predetermined opening APOs is set in advance based on various factors of the vehicle 100, experiments, and the like.

When the accelerator opening APO is increased before the process proceeds to step S23, the transmission controller 40 ends the first process and performs a shift based on the linear shift control according to the accelerator opening APO.

In step S23, the transmission controller 40 fixes the speed ratio of the variator 4 at a speed ratio when the accelerator opening APO reaches the predetermined opening APOs.

Accordingly, the engine rotation speed is maintained in a rotation speed region in which a sporty acceleration feeling can be obtained when the driver depresses the accelerator.

That is, the shift control is realized in accordance with the intention of the driver of desiring the sporty traveling.

In step S24, the transmission controller 40 determines whether the accelerator opening APO is increased.

When the transmission controller 40 determines that the accelerator opening APO is increased, the process proceeds to step S25. When the transmission controller 40 determines that the accelerator opening APO is not increased, the process proceeds to step S26.

In step S25, the transmission controller 40 performs a shift based on the normal shift control according to the accelerator opening APO.

Accordingly, when the driver depresses the accelerator heavily, a downshift is performed such that the engine rotation speed is increased, starting from the speed ratio fixed in step S23. In addition, when the driver depresses the accelerator slightly, an upshift is performed such that the engine rotation speed is decreased, starting from the speed ratio fixed in step S23.

In step S26, the transmission controller 40 determines whether a first predetermined time is elapsed since the speed ratio is fixed in step S23. The first predetermined time is set in advance based on various factors of the vehicle 100, experiments, and the like.

When the transmission controller 40 determines that the first predetermined time is elapsed, the process proceeds to step S25. When the transmission controller 40 determines that the first predetermined time is not elapsed, the process returns to step S24.

Accordingly, when the first predetermined time elapses without the driver depressing the accelerator, the shift based on the normal shift control is performed. That is, starting from the speed ratio fixed in step S23, the upshift is performed along a coast line in a shift map for the normal shift control.

In this way, when the driver does not depress the accelerator, it is possible to reduce fuel consumption by shifting to coast traveling based on the normal shift control.

Figure 4:
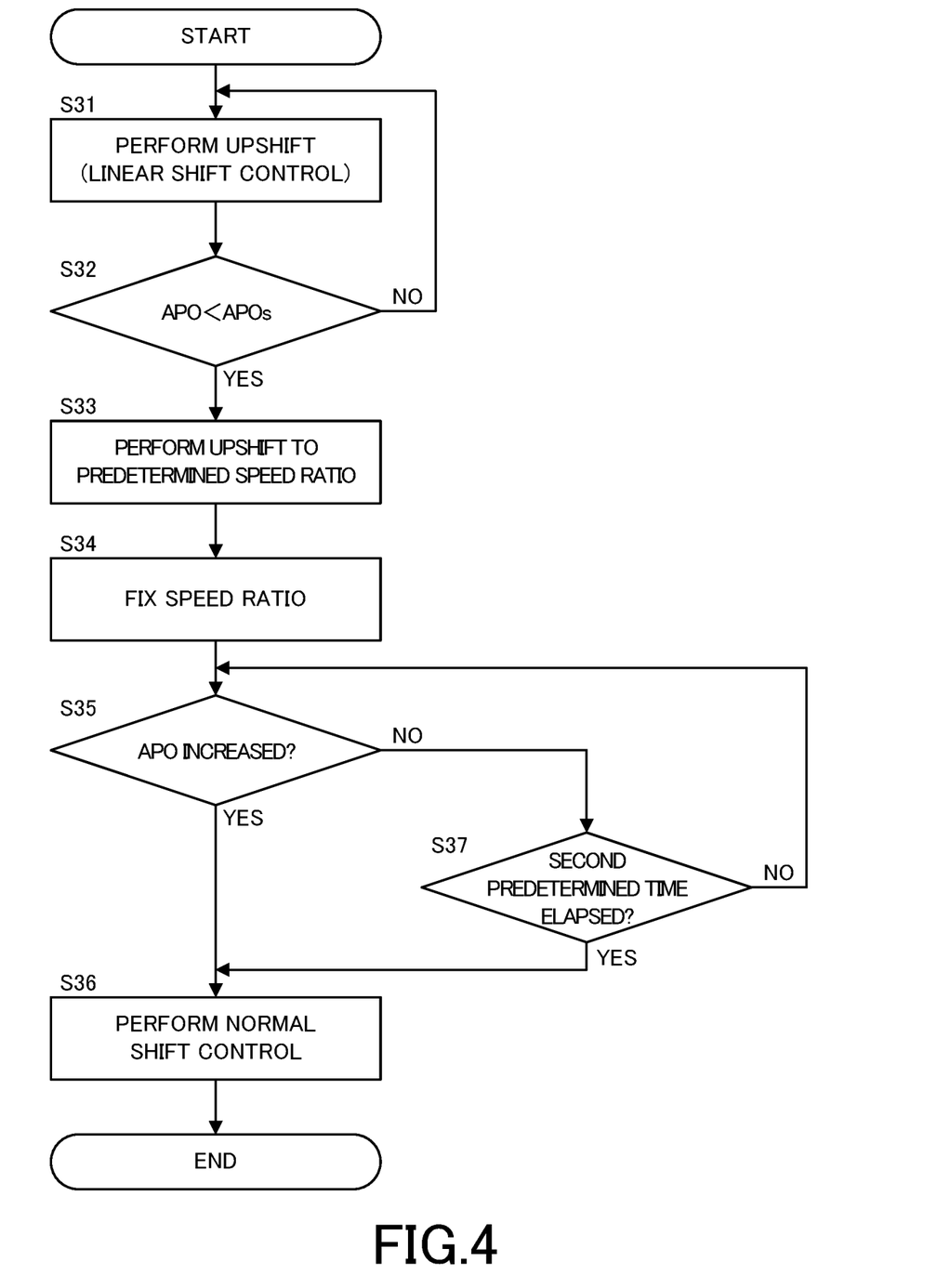
FIG. 4 is a flowchart of a second process.

Next, the second process will be described with reference to FIG. 4. FIG. 4 is a flowchart of the second process. The second process is executed when it is determined in the determination process that the second process is to be executed.

Processes of steps S31 and S32 in the second process are the same as the processes of steps S21 and S22 in the first process.

In step S33, the transmission controller 40 performs the upshift to a predetermined speed ratio starting from the speed ratio when the accelerator opening APO reaches the predetermined opening APOs.

When the accelerator opening APO is increased before the process proceeds to step S34, the transmission controller 40 ends the second process and performs the shift based on the linear shift control according to the accelerator opening APO.

In step S34, the transmission controller 40 fixes the speed ratio at the predetermined speed ratio. That is, the transmission controller 40 fixes the speed ratio to be higher than the speed ratio when the accelerator opening APO is the predetermined opening APOs.

As described above, the second process is executed in a situation in which it is considered that the driver may desire to continue the sporty traveling. Accordingly, the predetermined speed ratio is considered to be, for example, an intermediate speed ratio between the speed ratio when the accelerator opening APO reaches the predetermined opening APOs and a speed ratio determined based on the coast line in the shift map for the normal shift control.

Accordingly, the engine rotation speed is maintained in a rotation speed region in which a certain degree of acceleration feeling can be obtained when the driver depresses the accelerator. In addition, even when the driver intends to end the sporty traveling, the engine rotation speed is maintained in a state of being reduced to about half, and thus it is possible to prevent the driver from feeling uncomfortable.

In view of obtaining such an effect, it is preferable that a difference between an engine rotation speed when the accelerator opening APO reaches the predetermined opening APOs and an engine rotation speed during coast traveling is equal to or greater than a predetermined value. The predetermined value is, for example, 1000 [rpm]. The predetermined value is considered at the time of setting the predetermined rotation speed Nts in the determination process.

However, it can be said that such an effect can be obtained by fixing the speed ratio to be higher than the speed ratio when the accelerator opening APO reaches the predetermined opening APOs. That is, the predetermined speed ratio is not limited to the above. The predetermined speed ratio may be determined using, for example, a dedicated shift map set in advance based on various factors of the vehicle 100, experiments, and the like.

Processes of steps S35 and S36 are the same as the processes of steps S24 and S25 in the first process.

Accordingly, when the driver depresses the accelerator heavily, the downshift is performed such that the engine rotation speed is increased, starting from the speed ratio fixed in step S34. In addition, when the driver depresses the accelerator slightly, the upshift is performed such that the engine rotation speed is decreased, starting from the speed ratio fixed in step S34.

In step S37, the transmission controller 40 determines whether a second predetermined time is elapsed since the speed ratio is fixed in step S34. The second predetermined time is set in advance based on various factors of the vehicle 100, experiments, and the like.

When the transmission controller 40 determines that the second predetermined time is elapsed, the process proceeds to step S36. When the transmission controller 40 determines that the second predetermined time is not elapsed, the process returns to step S35.

Accordingly, when the second predetermined time elapses without the driver depressing the accelerator, the shift based on the normal shift control is performed. That is, starting from the speed ratio fixed in step S34, the upshift is performed along the coast line in the shift map for the normal shift control. The second predetermined time may be the same as the first predetermined time.

In this way, when the driver does not depress the accelerator, it is possible to reduce the fuel consumption by shifting to the coast traveling based on the normal shift control.

Figure 5:
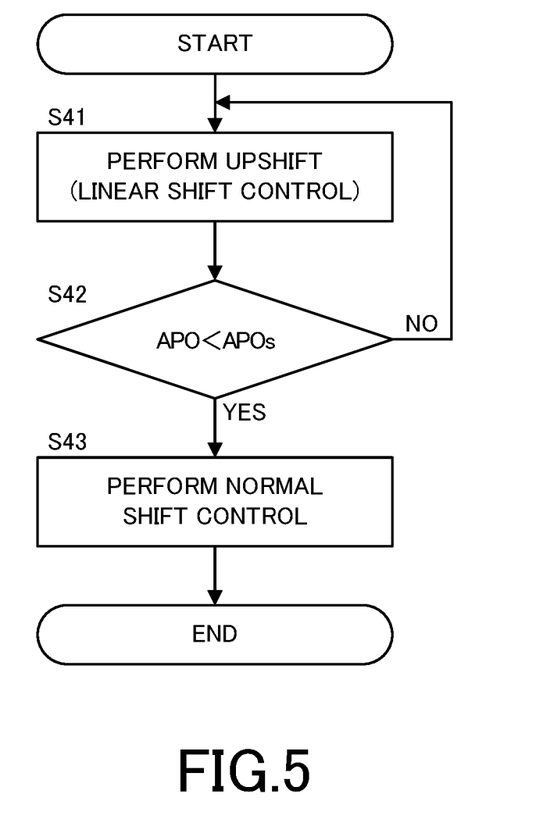
FIG. 5 is a flowchart of a third process.

Next, the third process will be described with reference to FIG. 5. FIG. 5 is a flowchart of the third process. The third process is executed when it is determined in the determination process that the third process is to be executed.

Processes of steps S41 and S42 in the third process are the same as the processes of steps S21 and S22 in the first process.

When the accelerator opening APO is increased before the process proceeds to step S43, the transmission controller 40 ends the third process and performs the shift based on the linear shift control according to the accelerator opening APO.

In step S43, the transmission controller 40 performs the shift based on the normal shift control according to the accelerator opening APO.

As described above, the third process is executed when the speed dAPO is not higher than the predetermined speed dAPOs and the turbine rotation speed Nt is not higher than the predetermined rotation speed Nts.

In such a case, there is a high possibility that the driver does not intend to perform the sporty traveling. In addition, even if an attempt is made to fix the speed ratio by upshifting from the speed ratio when the accelerator opening APO reaches the predetermined opening APOs as in the second process, the engine rotation speed may become low and unstable. Therefore, in the third process, when the accelerator opening APO is smaller than the predetermined opening APOs, the shift control quickly shifts to the normal shift control.

Figure 6:
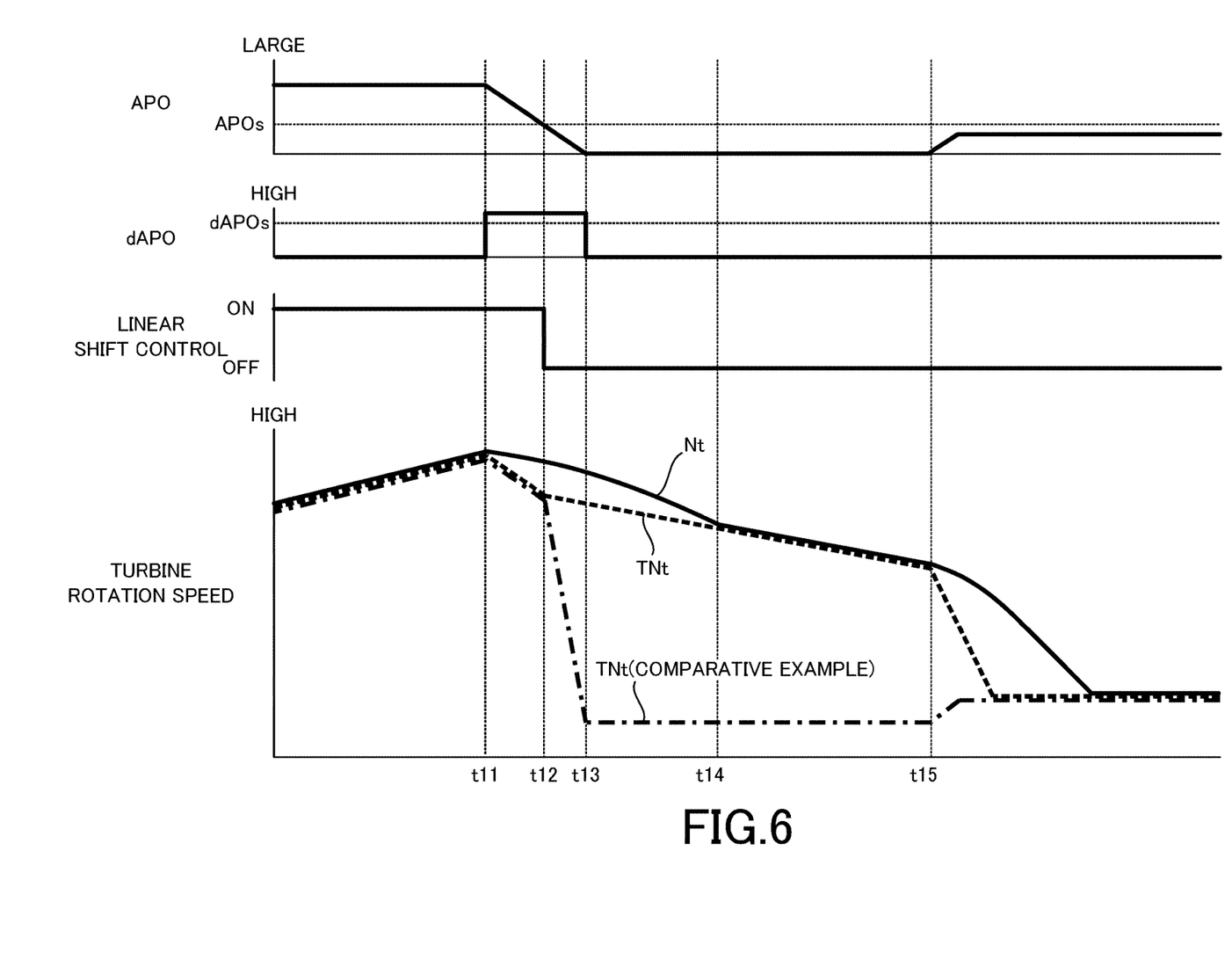
FIG. 6 is an example of a timing chart when the first process is executed.
Figure 7:
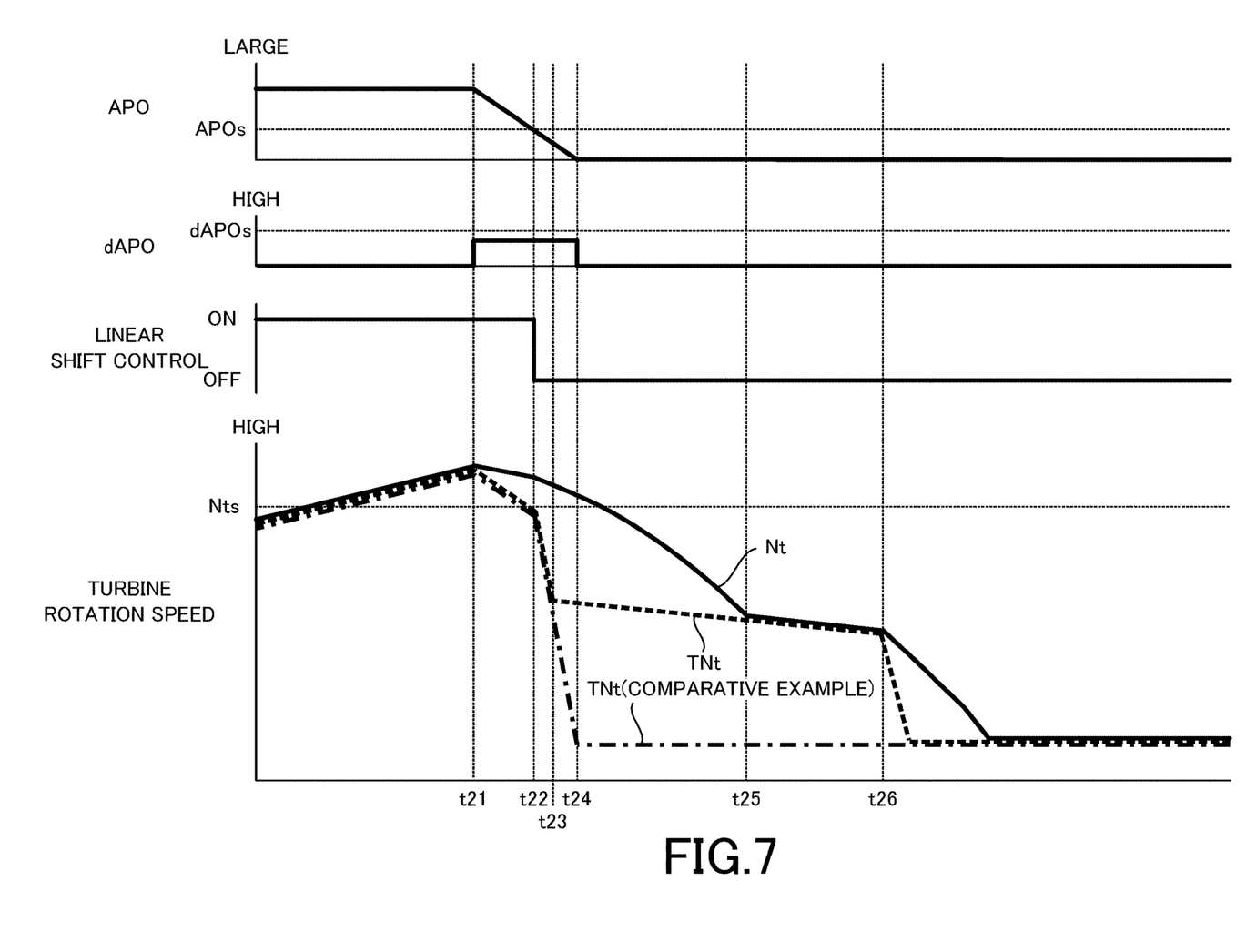
FIG. 7 is an example of a timing chart when the second process is executed.
Figure 8:
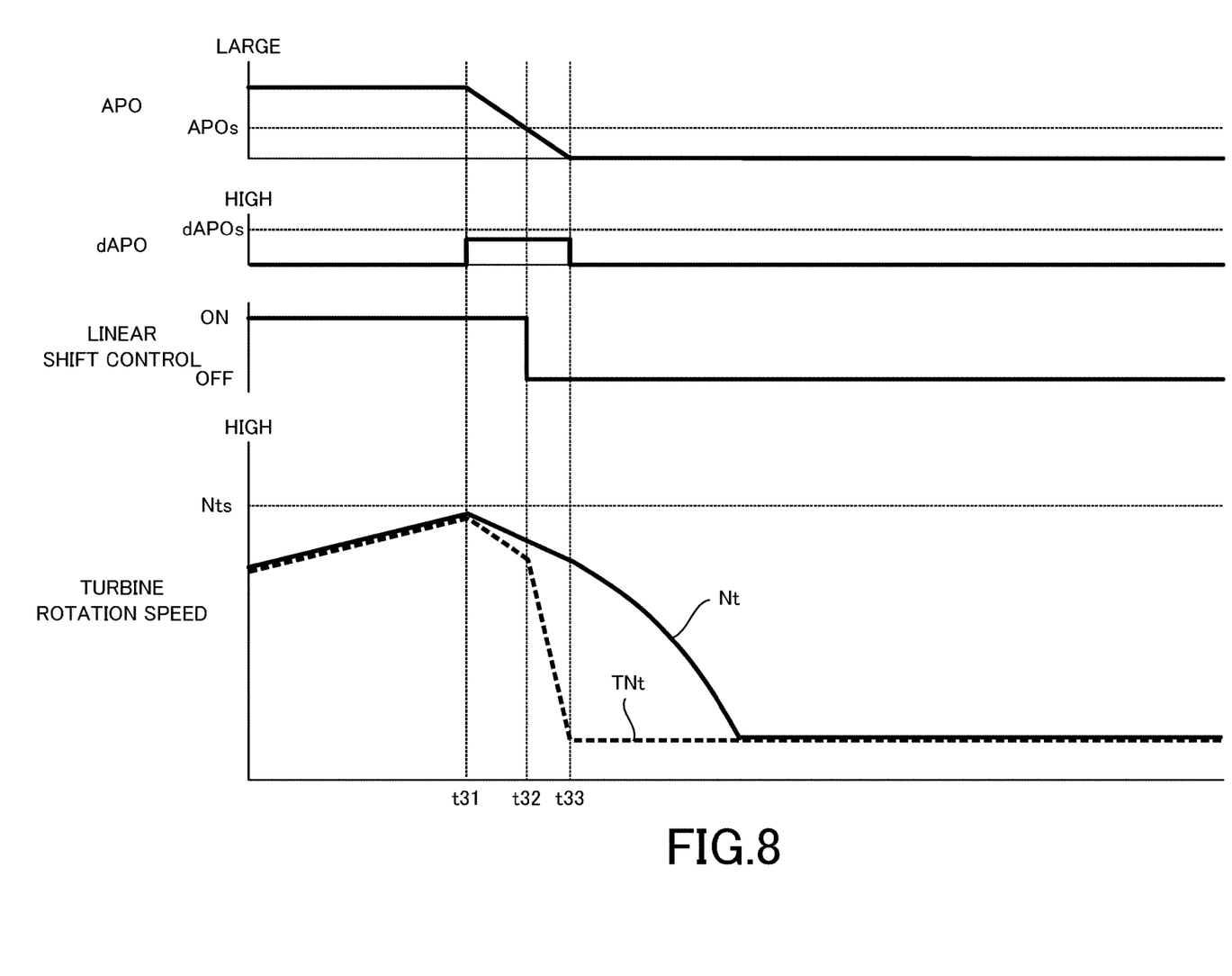
FIG. 8 is an example of a timing chart when the third process is executed.

Next, a state of the vehicle 100 when the accelerator release operation is performed during the execution of the linear shift control will be described with reference to FIGS. 6 to 8. FIG. 6 is an example of a timing chart when the first process is executed. FIG. 7 is an example of a timing chart when the second process is executed. FIG. 8 is an example of a timing chart when the third process is executed.

First, a case where the first process is executed will be described with reference to FIG. 6. In FIG. 6, the accelerator release operation is performed, and then the accelerator is slightly depressed. A target turbine rotation speed TNt indicated by a dashed-dotted line shows, as a comparative example, transition of the target turbine rotation speed TNt when the normal shift control is executed after a time t12.

At a time t11, the accelerator release operation is started, the accelerator opening APO is decreased, and the speed dAPO at which the accelerator opening APO is decreased is higher than the predetermined speed dAPOs.

The target turbine rotation speed TNt is decreased according to the accelerator opening APO, and the turbine rotation speed Nt is decreased. That is, the upshift based on the linear shift control is started.

When the accelerator opening APO is smaller than the predetermined opening APOs at the time t12, the linear shift control ends and the speed ratio is fixed.

At a time t13, the accelerator release operation ends, and the accelerator opening APO is zero. In the first process, since the speed ratio of the variator 4 is fixed at the time t12, the target turbine rotation speed TNt is decreased as a vehicle speed is decreased. In contrast, in a case of the comparative example, the target turbine rotation speed TNt is decreased according to the accelerator opening APO from the time t12 to the time t13.

In FIG. 6, the accelerator opening APO remains zero from the time t13 to a time t15. Accordingly, after the turbine rotation speed Nt is consistent with the target turbine rotation speed TNt at a time t14, the turbine rotation speed Nt is decreased according to the vehicle speed in a state of being consistent with the target turbine rotation speed TNt until the time t15 at which the accelerator opening APO is increased.

When the accelerator opening APO is increased at the time t15, the target turbine rotation speed TNt is decreased according to the accelerator opening APO. That is, the upshift based on the normal shift control is performed. Finally, the target turbine rotation speed TNt is consistent with the target turbine rotation speed TNt in the comparative example.

Next, a case where the second process is executed will be described with reference to FIG. 7. In FIG. 7, the accelerator release operation is performed, and then the accelerator is continued to be turned off. A target turbine rotation speed TNt indicated by a dashed-dotted line shows, as a comparative example, transition of the target turbine rotation speed TNt when the normal shift control is executed after a time t22.

At a time t21, the accelerator release operation is started, and the accelerator opening APO is decreased. In the example of FIG. 7, at the time t21, the speed dAPO at which the accelerator opening APO is decreased is lower than the predetermined speed dAPOs, and the turbine rotation speed Nt is higher than the predetermined rotation speed Nts.

The target turbine rotation speed TNt is decreased according to the accelerator opening APO, and the turbine rotation speed Nt is decreased. That is, the upshift based on the linear shift control is started.

When the accelerator opening APO is smaller than the predetermined opening APOs at the time t22, the linear shift control ends. Then, the target turbine rotation speed TNt is further decreased toward a time t23. That is, the speed ratio is further upshifted.

At the time t23, the speed ratio is fixed at the predetermined speed ratio.

At a time t24, the accelerator release operation ends, and the accelerator opening APO is zero. In the second process, since the speed ratio of the variator 4 is fixed at the time t23, the target turbine rotation speed TNt is decreased as the vehicle speed is decreased. In contrast, in a case of the comparative example, the target turbine rotation speed TNt is decreased according to the accelerator opening APO from the time t22 to the time t24.

In FIG. 7, after the time t24, the accelerator opening APO remains zero. Accordingly, after the turbine rotation speed Nt is consistent with the target turbine rotation speed TNt at a time t25, the turbine rotation speed Nt is decreased according to the vehicle speed in a state of being consistent with the target turbine rotation speed TNt until a time t26 at which the second predetermined time is elapsed.

When the second predetermined time is elapsed at the time t26, the target turbine rotation speed TNt is decreased according to the accelerator opening APO. That is, the upshift based on the normal shift control is performed.

In the example of FIG. 7, the upshift is performed along the coast line in the shift map for the normal shift control. Finally, the target turbine rotation speed TNt is consistent with the target turbine rotation speed TNt in the comparative example. Accordingly, the vehicle 100 is brought into a coast traveling state based on the normal shift control.

Next, a case where the third process is executed will be described with reference to FIG. 8. In FIG. 8, the accelerator release operation is performed, and then the accelerator is continued to be turned off.

At a time t31, the accelerator release operation is started, and the accelerator opening APO is decreased. In the example of FIG. 8, at the time t31, the speed dAPO at which the accelerator opening APO is decreased is lower than the predetermined speed dAPOs, and the turbine rotation speed Nt is lower than the predetermined rotation speed Nts.

The target turbine rotation speed TNt is decreased according to the accelerator opening APO, and the turbine rotation speed Nt is decreased. That is, the upshift based on the linear shift control is started.

When the accelerator opening APO is smaller than the predetermined opening APOs at a time t32, the linear shift control ends.

Then, the target turbine rotation speed TNt is decreased according to the accelerator opening APO from the time t32 to a time t33. That is, the upshift based on the normal shift control is performed. Accordingly, the vehicle 100 is brought into the coast traveling state based on the normal shift control.

Main functions and effects of the automatic transmission 20 configured as described above will be collectively described.

(1) The automatic transmission 20 to be mounted on the vehicle 100 is used for executing: when the accelerator opening APO is decreased while the vehicle 100 is traveling, the first process of performing, when the speed dAPO at which the accelerator opening APO is decreased is higher than the predetermined speed dAPOs, the upshift according to the accelerator opening APO until the predetermined opening APOs is reached, and fixing the speed ratio at the speed ratio when the accelerator opening APO is the predetermined opening APOs, the second process of performing, when the speed dAPO at which the accelerator opening APO is decreased is equal to or lower than the predetermined speed dAPOs and the turbine rotation speed Nt is higher than the predetermined rotation speed Nts, the upshift according to the accelerator opening APO until the predetermined opening APOs is reached, and further performing, when the accelerator opening APO is smaller than the predetermined opening APOs, the upshift from the speed ratio when the accelerator opening APO is the predetermined opening APOs so as to fix the speed ratio to be higher than the speed ratio when the accelerator opening APO is the predetermined opening APOs, and the third process of performing, when the speed dAPO at which the accelerator opening APO is decreased is equal to or lower than the predetermined speed dAPOs and the turbine rotation speed Nt is equal to or lower than the predetermined rotation speed Nts, the upshift according to the accelerator opening APO until the predetermined opening APOs is reached, and further performing, when the accelerator opening APO is smaller than the predetermined opening APOs, the upshift according to the accelerator opening APO.

Accordingly, when the accelerator opening APO is decreased, the second process of performing the upshift according to the accelerator opening APO until the predetermined opening APOs is reached, and further performing, when the accelerator opening APO is smaller than the predetermined opening APOs, the upshift from the speed ratio when the accelerator opening APO is the predetermined opening APOs so as to fix the speed ratio to be higher than the speed ratio when the accelerator opening APO is the predetermined opening APOs is added to the first process of performing the upshift according to the accelerator opening APO until the predetermined opening APOs is reached and fixing the speed ratio at the speed ratio when the accelerator opening APO is the predetermined opening APOs to maintain the engine rotation speed in a high state, and the third process of performing the upshift according to the accelerator opening APO until the predetermined opening APOs is reached, and further performing, when the accelerator opening APO is smaller than the predetermined opening APOs, the upshift according to the accelerator opening APO to decrease the engine rotation speed, and thus it is possible to prevent the engine rotation speed from becoming too high or too low for the intention of the driver. That is, it is possible to prevent the execution of the shift control against the intention of the driver when the accelerator opening APO is decreased.

(2)(4)(5) The automatic transmission 20 to be mounted on the vehicle 100 performs, when the accelerator opening APO is decreased while the vehicle 100 is traveling, the upshift according to the accelerator opening APO until the predetermined opening APOs is reached, further performs, when the accelerator opening APO is smaller than the predetermined opening APOs, the upshift from the speed ratio when the accelerator opening APO is the predetermined opening APOs so as to fix the speed ratio to be higher than the speed ratio when the accelerator opening APO is the predetermined opening APOs, and further performs the upshift thereafter from the fixed speed ratio.

Accordingly, when the accelerator opening APO is decreased, the upshift is performed according to the accelerator opening APO until the predetermined opening APOs is reached, and when the accelerator opening APO is smaller than the predetermined opening APOs, the upshift is further performed from the speed ratio at the predetermined opening APOs so as to fix the speed ratio, and the upshift is further performed thereafter from the fixed speed ratio. Therefore, it is possible to prevent the engine rotation speed from being excessively decreased, prevent the speed ratio from not being fixed, or prevent the speed ratio from being fixed in a situation where it is not preferable to fix the speed ratio. That is, it is possible to prevent the execution of the shift control against the intention of the driver when the accelerator opening APO is decreased.

(3) When the accelerator opening APO is decreased while the vehicle 100 is traveling and the speed dAPO at which the accelerator opening APO is decreased is higher than the predetermined speed dAPOs, the automatic transmission 20 performs the upshift according to the accelerator opening APO until the predetermined opening APOs is reached, and fixes the speed ratio when the accelerator opening APO is smaller than the predetermined opening APOs.

Accordingly, when the accelerator opening APO is decreased and the speed dAPO at which the accelerator opening APO is decreased is higher than the predetermined speed dAPOs, the upshift is performed according to the accelerator opening APO until the predetermined opening APOs is reached, and the speed ratio is fixed when the accelerator opening APO is smaller than the predetermined opening APOs. Therefore, it is possible to execute the shift control in accordance with the intention of the driver.

While an embodiment of the invention has been described, the embodiment is merely one of application examples of the invention, and does not intend to limit a technical scope of the invention to a specific configuration according to the embodiment.

For example, in the above embodiment, a case where the continuously variable transmission mechanism is the variator 4 has been described. However, the continuously variable transmission mechanism may be another continuously variable transmission mechanism.

Various programs executed by the transmission controller 40 may be stored in a non-transitory recording medium such as a CD-ROM.

DESCRIPTION OF REFERENCE SIGNS 100 vehicle
20 automatic transmission (continuously variable transmission)
40 transmission controller (computer)

The present application claims a priority of Japanese Patent Application No. 2021-006419 filed with the Japan Patent Office on Jan. 19, 2021, all the contents of which are hereby incorporated by reference.

The invention claimed is:

1. A continuously variable transmission to be mounted on a vehicle, wherein the continuously variable transmission is used for executing
when an accelerator opening is decreased while the vehicle is traveling,
a first process of performing, when a speed at which the accelerator opening is decreased is higher than a predetermined speed, an upshift according to the accelerator opening until a predetermined opening is reached, and fixing a speed ratio at the speed ratio when the accelerator opening is the predetermined opening,
a second process of performing, when the speed at which the accelerator opening is decreased is equal to or lower than the predetermined speed and a turbine rotation speed is higher than a predetermined rotation speed, the upshift according to the accelerator opening until the predetermined opening is reached, and further performing, when the accelerator opening is smaller than the predetermined opening, the upshift from the speed ratio when the accelerator opening is the predetermined opening so as to fix the speed ratio to be higher than the speed ratio when the accelerator opening is the predetermined opening, and
a third process of performing, when the speed at which the accelerator opening is decreased is equal to or lower than the predetermined speed and the turbine rotation speed is equal to or lower than the predetermined rotation speed, the upshift according to the accelerator opening until the predetermined opening is reached, and further performing, when the accelerator opening is smaller than the predetermined opening, the upshift according to the accelerator opening.

2. A continuously variable transmission to be mounted on a vehicle, wherein
when an accelerator opening is decreased while the vehicle is traveling,
an upshift is performed according to the accelerator opening until a predetermined opening is reached,
when the accelerator opening is smaller than the predetermined opening, the upshift is further performed from a speed ratio when the accelerator opening is the predetermined opening so as to fix the speed ratio to be higher than the speed ratio when the accelerator opening is the predetermined opening, and
the upshift is further performed thereafter from the fixed speed ratio according to the accelerator opening.

3. The continuously variable transmission according to claim 2, wherein
when the accelerator opening is decreased while the vehicle is traveling and a speed at which the accelerator opening is decreased is higher than a predetermined speed,
the upshift is performed according to the accelerator opening until the predetermined opening is reached, and
the speed ratio is fixed when the accelerator opening becomes smaller than the predetermined opening.

4. A method for controlling a continuously variable transmission mounted on a vehicle, the method comprising:
when an accelerator opening is decreased while the vehicle is traveling,
performing an upshift according to the accelerator opening until a predetermined opening is reached;
further performing, when the accelerator opening is smaller than the predetermined opening, the upshift from a speed ratio when the accelerator opening is the predetermined opening so as to fix the speed ratio to be higher than the speed ratio when the accelerator opening is the predetermined opening; and
further performing the upshift thereafter from the fixed speed ratio according to the accelerator opening.

5. A non-transitory computer-readable medium storing a program executable by a computer of a continuously variable transmission mounted on a vehicle, wherein
the program causes the computer to execute instructions for:
when an accelerator opening is decreased while the vehicle is traveling,
performing an upshift according to the accelerator opening until a predetermined opening is reached;
further performing, when the accelerator opening is smaller than the predetermined opening, the upshift from a speed ratio when the accelerator opening is the predetermined opening so as to fix the speed ratio to be higher than the speed ratio when the accelerator opening is the predetermined opening; and
further performing the upshift thereafter from the fixed speed ratio according to the accelerator opening.

* * * * *